United States Patent
Heemskerk

(10) Patent No.: US 8,325,579 B2
(45) Date of Patent: Dec. 4, 2012

(54) COMBINATION OPTICAL MEDIA, DEVICE AND METHOD FOR ACCESSING THEREOF

(75) Inventor: Jacques Heemskerk, Veldhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 648 days.

(21) Appl. No.: 11/721,678

(22) PCT Filed: Dec. 19, 2005

(86) PCT No.: PCT/IB2005/054318
§ 371 (c)(1),
(2), (4) Date: Jun. 14, 2007

(87) PCT Pub. No.: WO2006/067732
PCT Pub. Date: Jun. 29, 2006

(65) Prior Publication Data
US 2009/0245064 A1    Oct. 1, 2009

(30) Foreign Application Priority Data
Dec. 21, 2004   (EP) ..................... 04106786

(51) Int. Cl.
*G11B 7/20*   (2006.01)

(52) U.S. Cl. .......................................... 369/94

(58) Field of Classification Search ............ 369/103, 369/94
See application file for complete search history.

(56) References Cited

U.S. PATENT DOCUMENTS

| | | | |
|---|---|---|---|
| 5,315,570 A | 5/1994 | Miura et al. | |
| 5,715,225 A * | 2/1998 | Victora et al. | 369/94 |
| 5,764,610 A | 6/1998 | Yoshida et al. | |
| 5,959,280 A | 9/1999 | Kamatani | |
| 6,002,657 A | 12/1999 | Furukawa et al. | |
| 6,072,759 A | 6/2000 | Maeda et al. | |
| 6,320,840 B1 * | 11/2001 | Oh et al. | 369/286 |
| 6,373,799 B1 | 4/2002 | Ono et al. | |
| 6,643,238 B2 * | 11/2003 | Nakajima | 369/53.22 |

(Continued)

FOREIGN PATENT DOCUMENTS
EP    0838813 A2    4/1998
(Continued)

OTHER PUBLICATIONS

International Search Report of International Application No. PCT/IB2005/054318 Contained in International Publication No. W02006067732, Feb. 5, 2006.

(Continued)

*Primary Examiner* — Joseph Feild
*Assistant Examiner* — Aneeta Yodichkas

(57) ABSTRACT

A combination optical disc (1) is disclosed, which contains at least two information layers (10, 11) of at least two different storage formats selected from for example CD, DVD, BD. Information is stored on the disc (1) concerning the storage format of the layers (10, 11). According to an embodiment of the invention, each of the formats contains information indicating that a second, or even third, format is present on the same disc. Now a device may select a Format different from the one detected during start up. Alternatively, all formats present on a single disc are identified by an identifier on the disc. Such art identifier may be located in the BCA area, a chip (4) on disc or in a bar code on the disc itself.

16 Claims, 4 Drawing Sheets

U.S. PATENT DOCUMENTS

| | | | |
|---|---|---|---|
| 6,839,313 B2 * | 1/2005 | Araki et al. | 369/112.01 |
| 2002/0085466 A1 | 7/2002 | Shim | |
| 2002/0176342 A1 * | 11/2002 | Worthington et al. | 369/53.31 |
| 2003/0031109 A1 * | 2/2003 | Lee et al. | 369/59.25 |
| 2004/0032813 A1 | 2/2004 | Lee et al. | |
| 2004/0156290 A1 * | 8/2004 | Seo | 369/53.23 |
| 2004/0180266 A1 * | 9/2004 | Hirao et al. | 430/1 |
| 2004/0213091 A1 | 10/2004 | Shim | |
| 2006/0114808 A1 | 6/2006 | Sugaya et al. | |

FOREIGN PATENT DOCUMENTS

| | | |
|---|---|---|
| EP | 0899723 A2 | 3/1999 |
| EP | 1006513 A2 | 6/2000 |
| EP | 1030303 A2 | 8/2000 |
| JP | 10021673 A | 1/1998 |
| JP | 11213532 A | 8/1999 |
| JP | 2000132871 A | 5/2000 |
| JP | 2000285636 A | 10/2000 |
| JP | 2004347760 A | 12/2004 |
| JP | 2006155830 A | 6/2006 |
| WO | WO0106507 A1 | 1/2001 |
| WO | WO03063144 A2 | 7/2003 |

OTHER PUBLICATIONS

Written Opinion of the International Searching Authority for International Application No. PCT/IB2005/054318, Feb. 5, 2006.

* cited by examiner

COMBINATION OPTICAL MEDIA, DEVICE AND METHOD FOR ACCESSING THEREOF

This invention pertains in general to the field of optical storage media. More particularly the invention relates to combination optical media, i.e. optical media which comprise at least two information layers of at least two different formats, and corresponding systems and methods for accessing such combination optical media.

In optical recording various generations of optical disc are succeeding each other, depending on physical parameters like wavelength and NA of objective lens. In the 12 cm world, CD was first, then DVD, now Blu-ray Disc (BD) and/or HD-DVD and/or other versions like the Chinese proposal EVD.

A number of disc shaped optical storage media that combine different formats on different layers have been developed and are known in the art.

Combination disc formats, for example combining DVD-ROM on one side with DVD-RAM on the other side, have been approved by the DVD Forum. Such discs are double sided discs and are read from both sides. However, such discs require complicated disc readers having a plurality of reading devices for covering the two-sided access to such discs, or the disc must be turned upside down before accessing the other layer. Furthermore, such discs have the disadvantage that there is no surface remaining on the disc for a label. However, it is desired that the discs have a label on which the contents of the discs is indicated.

Another type of combination discs being proposed are hybrid DVDs having two information layers being accessed from the same side of the disc, which leaves the other side of the disc available for a label. For instance hybrid DVDs combining a DVD layer with a conventional CD layer are known. Both layers are read from the same side of the disc, which means that the DVD layer, being oriented closer to the entrance surface than the CD layer, must be reflective for radiation from a red laser accessing information on the DVD format layer, but will transmit radiation from an infra-red laser, having a different wavelength than the other laser, accessing information on the deeper located CD format layer. It is intended that such discs can be played on both a CD player, which will read the CD layer, and a DVD player, which will be able to read both the CD layer, i.e. with the IR laser, and the DVD layer, i.e. with the red laser. However, up to now Hybrid DVDs have undergone study and playability tests by the DVD Forum, but has been rejected for compatibility reasons. The main problem is that DVD players generally are designed to look for a CD layer first and play that, so ignoring the DVD layer.

More generally, on start-up of a hybrid disc the format of one of the layers recorded on the disc is detected, for example by detecting the distance between the information layer and the entrance surface of the laser beam, being 0.1 mm for BD, 0.6 mm for DVD, and 1.2 mm for CD. When a format is detected, the disc is accessed by setting the device setting for the format of that specific layer. Such an identification system is for instance disclosed in U.S. Pat. No. 5,764,610, and an optical pickup device for different disc formats is disclosed in EP-A2-0838813. However, on combination discs a second format is present on the same disc, but in a different layer of the disc. This second format is not detected. The device assumes there is only one format present. This problem is present in case of all kinds of combination discs of different formats, for instance CD/DVD combination discs or DVD/BD combination discs.

Since the search method may be different, different drives may find a different information layer. Until now the detection of one format does exclude the detection of the presence of the other one, so some drives will play the CD layer, while others will play the DVD layer. Once one layer has been found, players usually do not seek longer, so the other format layer may be missed.

Consequently, the start-up times of presently known disc accessing devices becomes long.

Hence, an improved combination disc and corresponding drives and methods for accessing such a disc would be advantageous and in particular such a drive allowing for increased flexibility for accessing different information layers on such a disc, combined with cost-effectiveness would be advantageous.

The objective of the present invention is to solve the problem of long start-up times for current and future optical drives, as well as to solve the problem of undefined start-up if combination-format discs, e.g. discs that have both a CD info layer and a DVD info layer, are loaded into the drive.

Accordingly, the present invention preferably seeks to mitigate, alleviate or eliminate one or more of the above-identified deficiencies in the art and disadvantages singly or in any combination and solves at least the above-mentioned problems by providing a combination optical medium, a device and a method for accessing such a medium, according to the appended patent claims.

The general solution according to the invention is to provide information on a combination disc concerning the format of at least one of the layers of the combination disc. For instance, in one format, say BD, information is stored if another format is present as well, e.g. DVD. In absence of the information, a drive will always know that a disc is a single format disc, otherwise the combination format will be known to the drive.

Alternatively the information may be recorded in a chip or in a bar code or in a BCA (Burst Cutting Area) integrated with the disc.

According to an embodiment of the invention, each, or at least two, of the formats contains information indicating that a second, or even third etc. format is present on the same disc. In this case, a disc accessing device may select a format different from the one detected during start-up.

According to another embodiment of the invention, all formats present on a single disc are identified by an identifier on the disc. Such an identifier may be located in the BCA area (Burst Cutting Area) holding disc parameters. Alternatively, such an identifier may be located in a chip-on-disc or in a bar code on the disc itself.

According to one aspect of the invention, a combination optical storage medium is provided, comprising at least two information storing layers, wherein the different layers have at least two different storage formats, and said medium comprises format information thereon from which the storage format of at least one of said layers is derivable.

According to a further aspect of the invention, a device for accessing an optical medium comprising at least two information storing layers is provided. The device is adapted to access the above-mentioned combination optical medium according to an aspect of the invention. The device comprises means for accessing different layers of the medium, and means for accessing different formats of these layers, as well as means for reading format information from the medium, wherein the storage format of at least one of the layers is derivable from the format information. The format information is in use of said device provided to the means for accessing the layers with a correct format.

According to another aspect of the invention, a method for accessing a combination optical storage medium is provided, comprising the steps of accessing format information stored on said medium, deriving a storage format of at least one of a plurality of information storing layers of said medium, and accessing said at least one information storing layer with said storage format.

According to yet a further aspect of the invention, computer-readable medium having stored thereon a computer program for processing by a processing device in an above-described device according to an aspect of the invention. The computer program enables carrying out of the above-mentioned method according another aspect of the invention and comprises a first code segment for accessing format information stored on a combination optical medium, a second code segment for deriving a storage format of at least one of a plurality of information storing layers of said combination optical medium, and a third code segment for accessing said at least one information storing layer with said storage format.

The present invention has the advantages over the prior art that it provides
  quick starting of an optical drive;
  unambiguous access to a plurality of formats on different layers of combination discs;
  reliable, and at no cost at drive side, i.e. positive recognition, no complicated algorithms that may fail; and
  no, or little cost at the disc side.

These and other aspects, features and advantages of which the invention is capable of will be apparent and elucidated from the following description of embodiments of the present invention, reference being made to the accompanying drawings, in which FIG. 1A is a plan view of a information layer combination optical disc comprising a chip in disc according to an embodiment of the invention;

The following description focuses on an embodiment of the present invention applicable to a combination optical medium and in particular to a combination optical disc. However, it will be appreciated that the invention is not limited to this application but may be applied to many other optical media including for example Minidiscs, containing both a MO recording layer and an embossed layer with pre-recorded information.

As indicated above, it is desired if a disc type recognition can take place as quickly and as completely as possible.

Figure 1A:
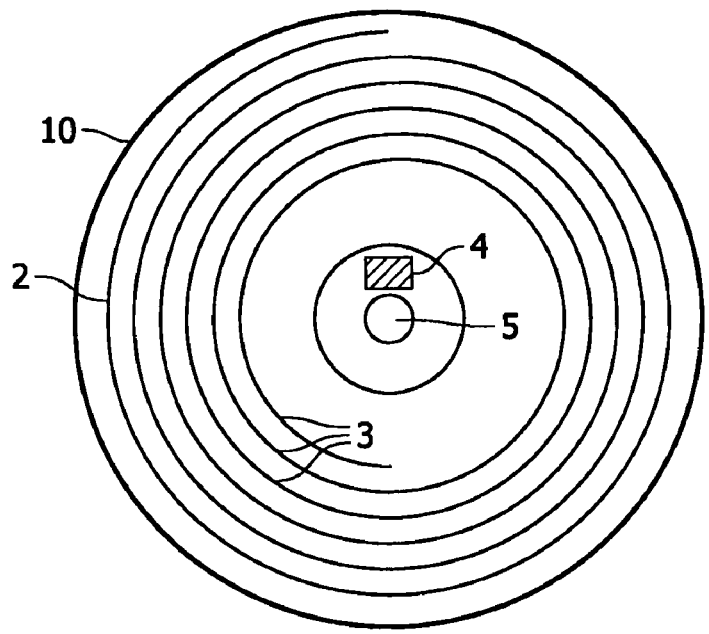
FIG. 1B is a perspective view of a combination disc comprising the layer of FIG. 1A.
Figure 1B:
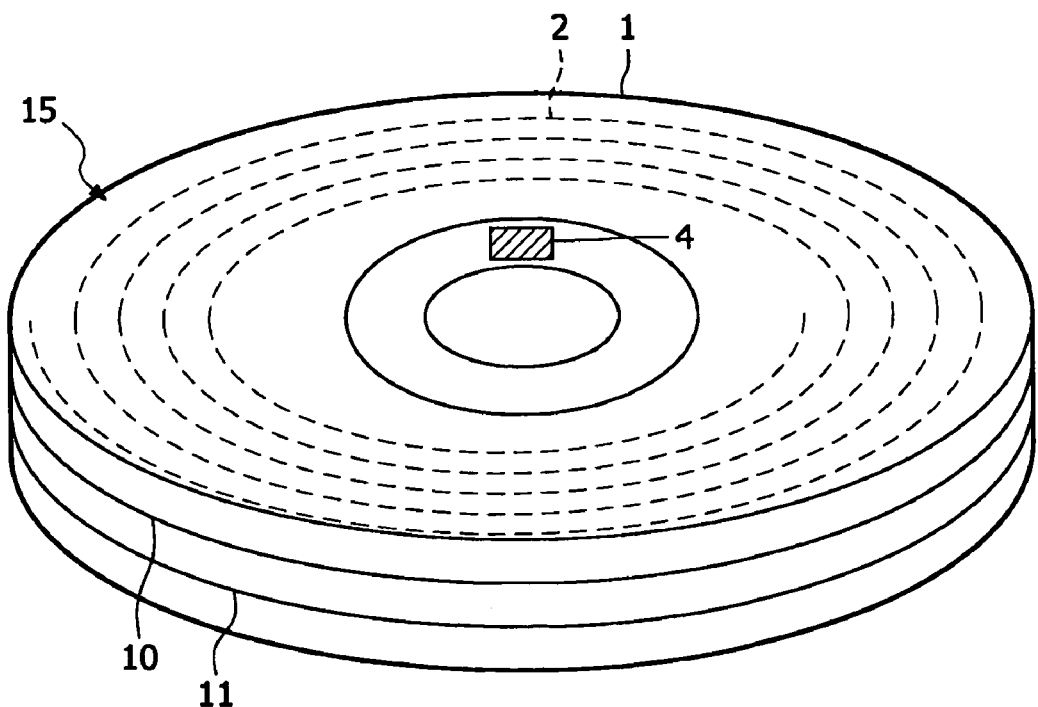

In an embodiment of the invention according to FIGS. 1A and 1B, an electronic memory chip 4 is integrated into a combination optical disc 1. The chip 4 comprises a memory on which information is stored concerning the format type of the layers 10, 11 on the disc 1. RF radiation is preferably used for reading out the information from the chip 4, wherein the energy for the information transfer from the chip is taken from the RF signal. Thus, the format type of the layers on the disc are identified. Alternatively, the format information may be stored on a holographic memory element integrated with the disc. In this case the format information is read out optically from the holographic element.

FIG. 1A illustrates an information layer of the optical disc 1, such as a CD, DVD, HD-DVD or Blu-Ray Disc format layer, with a single continuous spiral pattern 2, which in the case of pre-mastered discs comprises pits and plane areas. The spiral pattern 2 forms a plurality of essentially concentric circular tracks 3. An information layer having the CD format has about 22,000 tracks 3, whereas a DVD has about 47,000 tracks 3, a HD-DVD about 90,000 tracks and a BD about 110,000 tracks. Furthermore, the optical disc 1 has a center opening 5 for engagement with a drive spindle to rotate the optical disc 1.

The disc 1 is a combination optical disc having two information layers 10, 11, as illustrated in FIG. 1B and is based on an about 1.2 mm thick plastic disc having a diameter of 12 cm The information layer 10 may for instance be of the CD format and has in this case a substrate thickness (including layer 11) for the read out laser of 1.2 mm. For illustrative purposes the proportions shown in the figures are not to scale. The information layer 11 is for instance of the DVD or HD DVD format on a 0.6 mm substrate. One way to implement several information layers is achieved by using semi reflective materials such as silicone for the intermediate layer, i.e. layer 11 in this case.

Figure 2:
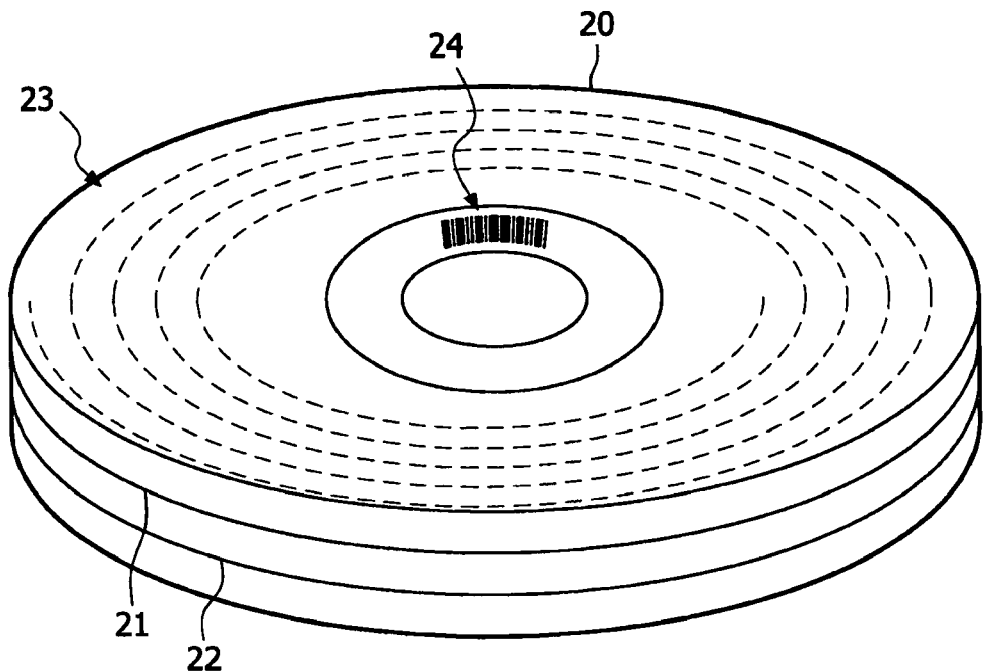
FIG. 2 is a schematic illustration of a combination optical disc comprising a bar code according to another embodiment of the invention.

A further embodiment of the invention is illustrated in FIG. 2, wherein a barcode 24 on the front surface 23 of a combination disc 20 having two information layers 21, 22 is arranged on the disc such that the barcode can be read before focusing on the information layer itself, which is usually below the entrance surface of the disc (0.1 mm below for BD, 0.6 mm below for DVD; 1.2 mm below for CD). In this case, the bar code 24, preferably on the entrance surface 23 of the disc 20, contain detailed information on the format of different layers 21, 22 of the combination disc 20, like CD/DVD combination discs or DVD/BD combination discs. Alternatively the information is stored in the Burst Cutting Area (BCA) of a disc (not shown).

The information concerning the storage format of the different layers of a disc provided by the two previous embodiments is preferably read out before accessing the information layers themselves, i.e. by reading the format information from chip 4 or from barcode 24. In this way, the format is known prior to accessing the layers and the correct access technique can be used by a player, based on this format information. In this way, the start-up time of the disc-player is much faster than of the prior art player, as described above.

Figure 3:
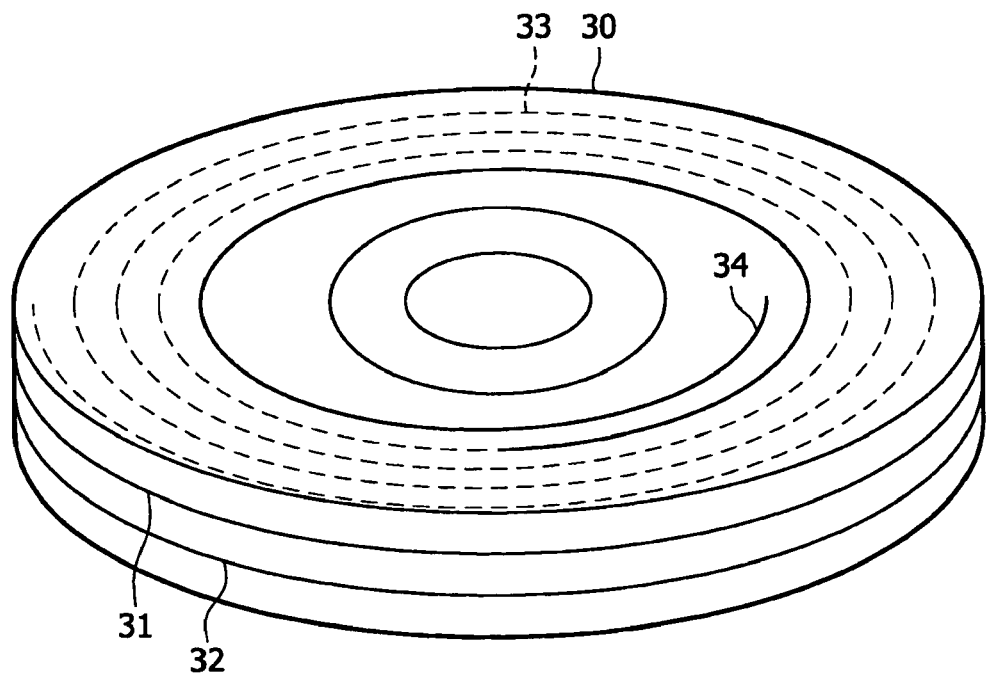
FIG. 3 is a schematic illustration of a combination optical disc comprising format information concerning a second layer in a first information layer of the disc according to a further embodiment of the invention.

In a further embodiment of the invention, being illustrated in FIG. 3, a combination optical disc 30 is provided comprising format information concerning a second layer 32 in a first information layer 31 of the disc. The information is illustrated by the continuous line 34 of the spiral pattern 33 of layer 32. Assume that the first layer 31 is accessed first, and the player is conventionally "locked" to this layer, as described above. In this case, the information concerning the format of a second layer 32 is read from the first layer 31. Now, the drive accessing combination disc 30 is aware of a second layer and its format. Accessing the second layer 32 is simply a matter of adjusting the drive to reading the second layer.

For instance, for a CD/DVD disc the CD layer comprises information concerning a second layer being in a DVD format, and the DVD layer comprises information concerning a second layer, being a CD layer. Until now one format did not indicate the presence of the other one, so some drives played the CD layer, while others played the DVD layer after start-up, without a possibility of accessing the other layer. Once one layer had been found, players did not seek longer. Due to the fact that, according to this embodiment of the invention, one format includes information if another format is present as well, a drive always knows if a disc is a single format disc or a combination format, and which combination the format has.

Figure 4A:
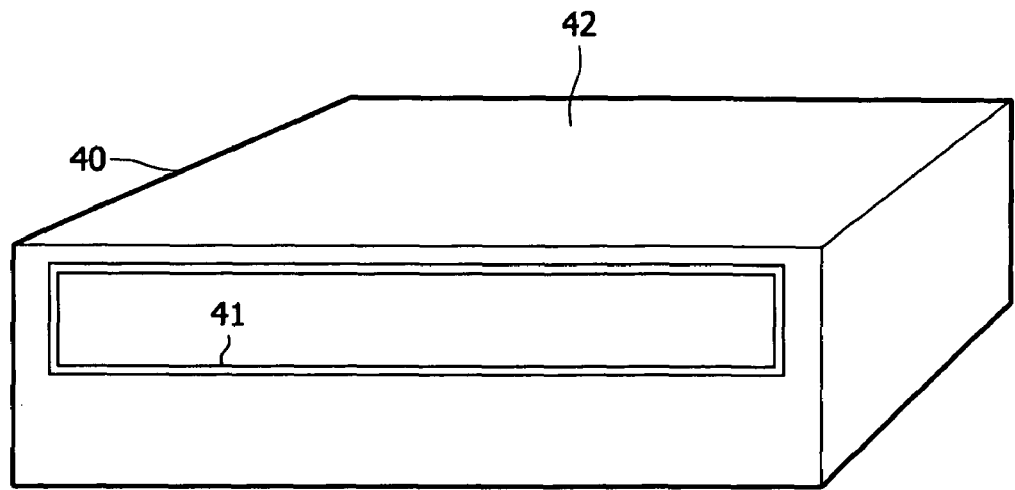
FIGS. 4A and 4B are schematic illustrations of a device for accessing a combination optical disc according to an embodiment of the invention.
Figure 4B:
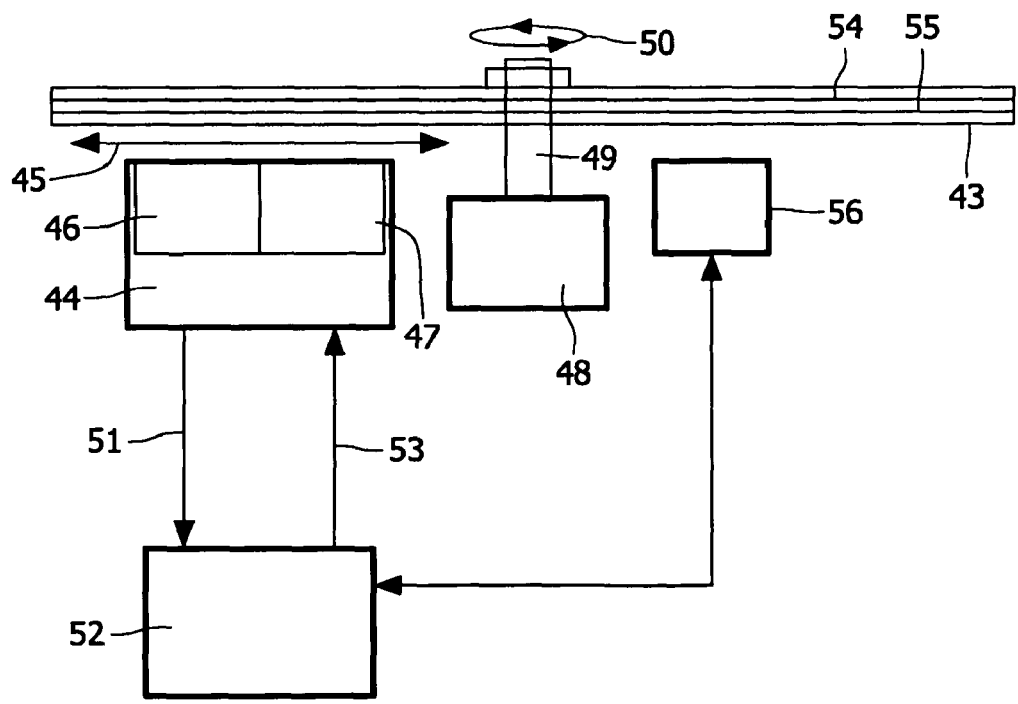

In another embodiment of the invention according to FIGS. 4A and 4B, a device 40 for accessing a combination optical disc 43 is provided. The device 40 is for instance a reader for CD/DVD combination discs and comprises a tray 41 or other suitable arrangement for feeding a disc 43 into the housing 42 of device 40. The device is for instance a drive of a computer or a consumer player for discs 43. The optical medium 43 to be accessed by means of the drive comprises at least two information storing layers 54, 55. The device 40 is adapted to access the above-mentioned combination optical discs, e.g. a CD/DVD. The device comprises means 44 for accessing different layers of such a disc 43, and means for accessing different formats of these layers, as well as means 56, 52 for reading format information from the medium 43, wherein the storage format of at least one of the layers is derivable from the format information. The format information is in use of the device provided with the means for accessing the layers with a correct format.

More precisely, a disc drive 48,49 in the form of a spindle motor 48 and a rotatable spindle 49 is adapted to rotate the optical disc 43 in a direction indicated by arrow 50 in FIG. 4B, in a manner which is well known in the art. A laser pickup unit 44 is positioned close to the surface opposite the label side of the optical disc 43 and is movable in a radial direction of the optical disc 43, as is indicated by the arrow 45 in FIG. 4B. The laser pickup unit 44 operates to irradiate the optical disc 43 with a beam of laser light, detect reflections from the optical disc, produce a readout signal in response thereof and provide this signal for further processing. When accessing information from the disc, the optical disc 43 will be kept in rotation by the disc drive, i.e. the spindle motor 48 and the spindle 49.

The laser pickup unit 44 comprises mechanical drive means 46 for causing the optical assembly or optical read device 47 of the laser pickup unit 44 to move radially along the surface of the optical disc 43 in the direction of arrow 45 indicated in FIG. 4B between different radial positions. However, such mechanical drive means 46 are well known per se in the technical field, and it is left to the skilled person to choose the suitable mechanical and electrical components, such as an electric motor and a mechanical carriage arrangement, depending on an actual implementation. In essence, any equipment will do, which is capable of making the optical components 47 of the laser pickup unit 44 move with high precision in the desired radial direction. Furthermore, the laser source may be chosen among a variety of commercially available components and may operate in a desired wavelength range, for instance at about 800 nm (infrared) for a CD, 650 nm (red) for a DVD or 405 nm (blue) for a BD. For instance in the case of a CD/DVD disc 43, the optical components 47 comprise an infrared laser for the CD layer and a red laser for the DVD layer.

The output signal from the laser pickup unit 44 is a high frequency (HF) information signal 51 that arises from the scattering, absorption and reflection of the actual pit and land pattern present in a track on an information layer of the disc 43. Preferably, the HF signal 51 is sampled and converted into digital form by an Analog-to-Digital converter (ADC) before further processing. By doing so, the flexibility of the system is increased since the subsequent processing of the signal is more easily performed in the digital domain, rather than in the analog counterpart since new functions and calculation algorithms may be more easily implemented in the digital domain.

A processing device, such as a processor, 52 of the drive 40 may be implemented by any commercially available microprocessor. Alternatively, another suitable type of electronic logic circuitry, for instance an Application-Specific Integrated Circuit (ASIC) or a Field-Programmable Gate Array (FPGA) may substitute the processor 52. Correspondingly, further components, such as memory, input devices and output device of the drive (not illustrated) may all be implemented by commercially available components and are not described in any detail herein.

The processor 52 controls the function of drive 40. For instance, the processor controls the rotational speed of motor 48, the radial position of the pickup unit 44, and receives the HF signal 51 for further processing, e.g. for decoding and sending to an audio-visual unit for presentation of audio-visual data read from disc 43.

Furthermore, the drive is adapted to read format information for at least one information layer from disc 43. Depending on the way this format information is stored on disc 43, e.g. as described above, in a barcode, a chip-in-disc or as part of the information stored on a track of the disc, the drive 40 will read this format information in an appropriate way. For instance, when the disc 43 comprises a chip with the format information, a radio communication unit 56 reads the information from the chip in the disc 43. Alternatively, if the disc 43 comprises information in a barcode on the disc or as part of the information stored on a track, the optical pickup unit will read this information from the disc 43.

For instance, if disc 43 is a CD/DVD disc, and layer 54 is a CD layer and layer 55 is a DVD layer, a red laser from the optical unit 47 is active and the optical pick-up unit 47 is set to read the DVD information from layer 55 and various servo-electronics settings for tracking and focusing are set to DVD values, and the pit-reflectivity signal 51 is sent to a DVD decoder of the drive 40. Furthermore, from the format information available to processor 52, the drive may switch to accessing the CD layer 54 at any time. In this case, the red laser is switched off, the infra-red laser is switched on and the pick-up unit 47 is set to read the CD information from layer 54, various servo-electronics settings for tracking and focusing are set to CD values, and the pit-reflectivity signal 51 is sent to a CD decoder of the drive 40.

Figure 5:
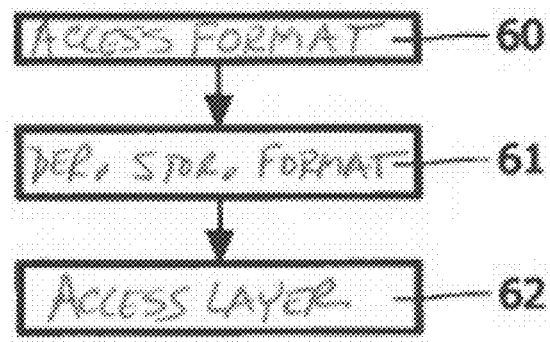
FIG. 5 is a flowchart illustrating a method for accessing a combination optical disc according to an embodiment of the invention.

In a further embodiment of the invention according to FIG. 5, a method for accessing a combination optical disc according to an embodiment of the invention is provided. The method comprises the steps of accessing format information stored on the disc, deriving a storage format of at least one of a plurality of information storing layers of said disc, and accessing said at least one information storing layer with said storage format.

In the flowchart of FIG. 5, the steps corresponding to the above-described method are illustrated, namely:
  Step 60—Access format information;
  Step 61—Derive storage format; and
  Step 62—Access layer.

Step 60 of the embodiment comprises accessing format information from a disc 43 by means of a disc reader 40. More precisely, the disc reader reads format information from a disc 43, for instance by reading out a chip-in-disc 4 by RF communication, a barcode 24 or format information stored on a track of an information layer of disc 43 by a optical pick-up unit. Alternatively, the method may comprise a predefined sequence for finding the format information, for instance firstly the presence of a chip-in-disc is checked by sending an appropriate RF poll signal. When an RF answer is received, this indicates the presence of a chip-in-disc and format information is accessed therefrom. Otherwise, access to a barcode or BCA is initiated and if present, the format information is read. In the case that still no format information is accessible, a predefined region, preferably the start-up region of a track of an information layer of the disc 43 is read. The information is analyzed by a processing means and if format information is present, it is used for further processing. Finally, if still no format information is present, it is concluded that the disc 43 is not a combination optical disc, but a disc having a single or unknown storage format.

Figure 6:
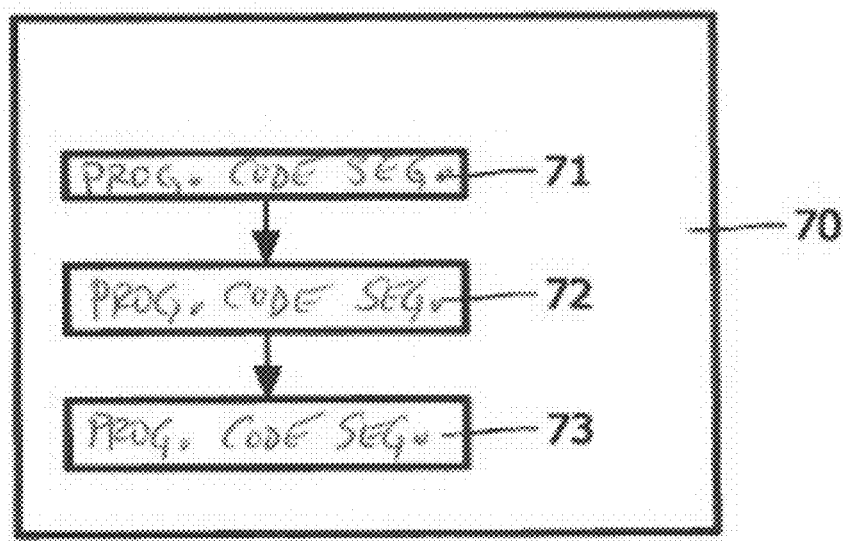
FIG. 6 is a schematic illustration of a computer readable medium comprising program code segments according to another embodiment of the invention.

FIG. 6 is a schematic illustration of a computer readable medium (70) comprising program code segments (71, 72, 73) according to another embodiment of the invention. The computer-readable medium is for instance a memory chip connected to processing unit 52 of device 40, and has stored thereon a computer program for processing by this processing device. The computer program enables for instance carrying out of the above-mentioned method according to an embodiment of the invention and comprises a first code segment 71 for accessing format information stored on a combination optical medium, specifically the media describe with reference to FIGS. 1-3. A second code segment 72 for deriving a storage format of at least one of a plurality of information storing layers of said combination optical medium, and a third code segment 73 for accessing said at least one information storing layer with said storage format.

As mentioned above, a combination disc within the frame of this specification is for instance a disc comprising at least two different information layers having formats like CD, DVD, HD-DVD, BD, or generally any optical disc. A disc player is consequently a player, which can read such a disc.

Even if the description above has referred to an optical disc that has information layers with a single continuous spiral pattern of pits and plane areas, forming in essence a large number of concentric interconnected tracks, it is envisaged that the present invention may also be applied to other optical media, containing not a single spiral pattern but a plurality of non-connected circular or annular information tracks.

Applications and use of the above-described features of the invention are various and include exemplary fields such as computer disc drives, consumer audiovisual recorders and players, etc.

The invention can be implemented in any suitable form including hardware, software, firmware or any combination of these, depending on the aspect of the invention, respectively. However, when the invention is implemented as computer software, this may run on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the elements of the invention may be implemented suitably in a single unit, or may be physically and functionally distributed between different units and processors.

Although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different disc formats than those described above.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A combination optical medium comprising:
    at least two information storing layers having different storage formats, and
    an area, located on one of the at least two information storing layers, containing information indicating a presence of a different storage format associated with another one of the at least two information storage layers, and from which the different storage formats of each of the two information storing layers are derivable.

2. Combination optical medium according to claim 1, wherein said area containing said format information is represented as a memory means integrated with said medium.

3. Combination optical medium according to claim 2, wherein said memory means is an electronic memory means adapted to be read out via radio frequency based communication with said memory means.

4. Combination optical medium according to claim 2, wherein said memory means is represented as a holographic information carrier on said medium.

5. Combination optical medium according to claim 1, wherein said format information is stored as a barcode integrated with said medium.

6. Combination optical medium according to claim 5, wherein said barcode is arranged on an entrance surface of said medium.

7. Combination optical medium according to claim 5, wherein said entrance surface is a Burst Cutting Area (BCA) of said medium.

8. Combination optical medium according to claim 1, wherein said format information is stored in a start-up mark of said medium.

9. Combination optical medium according to claim 1, wherein said format information comprises the storage format of at least two of said layers of said medium.

10. Combination optical medium according to claim 1, wherein said layers are solely accessible for reading out and/or writing from one side of said medium.

11. Combination optical medium according to claim 1, wherein said storage formats of said layers is chosen from any combination of formats compatible with CD, SACD, DVD, HD-DVD, BluRay disk or EVD.

12. A device for accessing an optical medium comprising at least two information storing layers having different storage formats, said device, comprising
    means for accessing one of said information storage layers of said medium,
    means for reading format information from said accessed layer, wherein format information of the accessed layer and format information of at least one other of said at least two information layers is derivable from said format information stored on said accessed layer, wherein a format of the at least one other information layer is different than the format of the accessed layer and where said means for accessing said layers is adapted to access information on each of said information storing layers with a corresponding format.

13. An apparatus comprising the device according to claim 12, wherein the apparatus is a disc drive for accessing a combination optical disc.

14. A method of accessing a combination optical medium, comprising the steps of
   accessing an area on one layer of the combination optical medium, the area comprising format information for the format of each of the information storing layers, wherein said information storing layers have different storage formats,
   deriving a storage format of at least one of said information storing layers based on the format information stored in said area, and
   accessing said at least one information storing layer with said storage format.

15. Method according to claim 14, wherein said storage format is derived during start-up of said medium.

16. A non-transitory computer-readable storage medium having embodied thereon a computer program for accessing multi-layer combination optical medium wherein different layers have different storage formats, by a processing device in a device, the computer program comprising:
   a first code segment for accessing an area on a first information storing layer comprising format information for each of the formats of the information storing layers,
   a second code segment for deriving a storage format of the information storing layers of said combination optical medium, and
   a third code segment for accessing said at least one information storing layer with a corresponding one of said storage formats.

* * * * *